United States Patent [19]

Bradley, Jr. et al.

[11] 4,293,573

[45] Oct. 6, 1981

[54] PREPARATION OF FROZEN YOGURT

[75] Inventors: Robert L. Bradley, Jr., Madison, Wis.; Majid Hekmati, Karaj, Iran

[73] Assignee: Wisconsin Alumni Research Foundation, Madison, Wis.

[21] Appl. No.: 25,615

[22] Filed: Mar. 30, 1979

[51] Int. Cl.$^3$ ............................................... A23C 9/12
[52] U.S. Cl. ........................................ 426/43; 426/583
[58] Field of Search .................. 426/34, 43, 583, 41, 426/42

[56] References Cited

U.S. PATENT DOCUMENTS 4,110,476  8/1978  Rhodes ................................. 426/41
4,163,802  8/1979  Redfern et al. ................. 426/583 X

*Primary Examiner*—David M. Naff
*Attorney, Agent, or Firm*—McDougall, Hersh & Scott

[57] ABSTRACT

A frozen yogurt is prepared containing an admixture of cream, condensed skimmilk, sucrose, corn sweetener, stabilizers and 30–50% fluid acid whey based on the total weight of the admixture. In preparing the yogurt, a mixture of the condensed skimmilk and cream is pasteurized and fermented with a yogurt culture. The resulting fermented mixture is mixed with a pasteurized mixture of the sucrose, corn sweetener, stabilizers and fluid acid whey and the resulting mixture is homogenized and frozen to produce the frozen yogurt.

1 Claim, No Drawings

PREPARATION OF FROZEN YOGURT

This invention relates to the preparation of frozen yogurt and compositions and it relates more particularly to frozen yogurt which is formulated to contain acid whey as a major component thereof.

Acid whey is a by-product of the manufacture of cottage cheese and as used herein means either the fluid acid whey from the cottage cheese process or condensed or dried acid whey solids which may be reconstituted in water In the United States alone, in the year 1976, 6,800 million pounds of acid whey were produced as a by-product of the manufacture of 1,020 million pounds of cottage cheese. Acid whey is a material of considerable food value yet only a small fraction of its production finds utilization in human foods, animal feed, or in the manufacture of sherbets. The remainder must be disposed of but that is accomplished with considerable difficulty because of federal, state and municipal regulations and at relatively high cost.

Considerable effort has been and is being expended in the search for new uses of by-product acid whey wherein benefit can be derived from the food values which are otherwise wasted and wherein the problems and costs of disposal would no longer exist.

Thus, it is an object of this invention to produce and to provide a method for producing food products in which by-product acid whey finds beneficial use, and it is a related object to produce and to provide a method for producing a frozen yogurt containing substantial amounts of by-product acid whey, in which the resulting frozen yogurt is characterized by excellent flavor, improved body and texture and whereby the inclusion of by-product acid whey as a component thereof may either provide for increased protein content by comparison with formulations using water as the diluent, or as a partial substitute for more costly components.

In accordance with the practice of this invention, by-product acid whey is utilized as a component in the manufacture of frozen yogurt and particularly a soft-serve frozen yogurt, which is characterized by good body, texture and taste, especially when formulated with citrus and berry flavorings and in which the protein content may be desirably increased thereby to make beneficial use of some of the food values contained in the acid whey.

Normally frozen yogurt is produced with a solids content of 24-32% by weight made up of 0.5-4.0% by weight milk fat, 7-15% by weight non-fat milk solids, 0.1-0.5% by weight stabilizer, 7-12% by weight sucrose, and 4-10% by weight corn syrup solids, with the remainder water. The sucrose, stabilizer and non-fat dry milk solids can be dry mixed and then blended with milk in a suitable blender.

The mixture is pasteurized at 180° F. for 20 minutes or a similar time/temperature relationship and then homogenized at approximately 2300 psi. The homogenized formulation is cooled to 110° F. and transferred to a ripening vat where active yogurt culture is added. The mixture is held undisturbed until the pH reaches 4.2. This usually requires 3 to 6 hours.

When set, the mixture is cooled to 71°-75° F. and texturized by processing through a homogenizer without pressure. Fruit or other flavoring is added along with any remaining sweetener as a pasteurized solution followed by blending to produce the final product which can be used for making hard pack, soft-serve or other novelty food products.

When use is made of acid whey in accordance with the practice of this invention, it is necessary to maintain separation between the dairy ingredients and the remainder until fermentation of the dairy ingredients has been completed. For this purpose, the mix is prepared in two parts, one which is the dairy portion contains only cream and condensed skim milk while the other which is the "non-dairy" portion contains the sucrose (in the form of cane or beet sugars), corn sweetener, stabilizer and the acid whey.

The ingredients for each of the two parts are mixed and separately pasteurized, homogenized, and cooled. The stabilizer-sweetener-acid whey portion can be cooled down directly to about 40° F. while the dairy part is cooled to about 110° F., inoculated with an acidophilus yogurt culture and incubated without agitation until acidity developed to about 1.2% titratable acidity. The dairy portion is subsequently agitated and cooled to about the temperature of the non-dairy portion. During cooling the acidity will increase, usually to about 1.4% titratable acidity.

The two parts can thereafter be mixed and processed, as by passage through a sour cream valve or other low pressure homogenizer to reduce the mixture to a smooth creamy texture and then be blended with one or more flavoring ingredients. The resulting product can be frozen quiescently in containers for storage or shipping until needed for use in a soft-serve operation or used directly either in a soft-serve freezer or in a continuous or batch freezer to produce a hardened frozen confection or food product. When blended and flavored, the mix can have an acidity which may fall to as low as pH 4.2 but which can be adjusted in the manner currently practiced with 50% citric acid to an acidity acceptable to the consumer.

Having described the basic concepts or this invention, illustration will be made by reference to the following example, which is given by way of illustration and not by way of limitation.

TABLE I

Formulation and Ingredients Used to Prepare Frozen Yogurt Mix

| Composition | | | # to |
| Component | % Solids | Ingredients Used | prepare 100# mix |
| --- | --- | --- | --- |
| Milkfat | 2.5 | 30% Cream | 8.33 |
| Milk Solids-Not-Fat | 10.0 | 30% Condensed Skim | 31.63 |
| Sucrose | 10.0 | Sucrose | 10.00 |
| Corn Sweetener | 6.0 | Corn Sweetener (43 D.E.) | 6.25 |
| Stabilizer | 0.4 | Sherbet Stabilizer | 0.40 |
| Acid Whey | 2.8 | Acid Whey | 43.39 |
| Total Solids | 31.7 | | |

In preparation, the cream and condensed skim milk are combined in a first mixture. The sucrose, corn sweetener, stabilizer and acid whey are combined in a second mixture separate and apart from the first. Both mixtures are separately pasteurized by heating to a temperature of 180° F. for 20 minutes, followed by homogenization at 2500 psi two stage and then cooled. The second non-dairy mixture is cooled directly to about 40° F. while the first dairy mixture is cooled to only about 110° F. and then inoculated with an acidophilus yogurt culture. The inoculated dairy portion is incubated until the titratable acidity reaches 1.2%. The dairy portion is then cooled down to about 40° F. for joinder with the cooled down non-dairy portion. When cooled down, the dairy portion had a titratable acidity measuring about 1.4% and a pH of about 5.2.

The two portions are mixed and processed through a sour cream valve to minimize any curdy or grainy texture, after which flavoring ingredients, such as raspberry, lemon, orange, etc., are blended into the processed mixture which is now ready to freeze. When blended and flavored the final product of the above example had a pH of 4.3.

The product can be frozen via a soft-serve freezer or it can be processed in a continuous or batch freezer as a frozen yogurt having good taste and texture. This frozen yogurt can also be packaged in conventional dairy packaging specifically half or one gallon containers, and quiescently frozen at −20° F. Storage of the frozen product can last up to 6 months without deleterious reactions occuring. When needed for use, the frozen product is thawed slowly at 35°-40° F. under refrigeration for 24 to 48 hours, shaken vigorously to remix the separated sugar syrup, and frozen using a conventional soft-serve freezer.

Other than the acid whey, the ingredients are of the type conventionally employed in commercial manufacture of yogurt. For example, sources other than cream or skimmed milk may be used for the dairy ingredients, and the amounts thereof can be varied over a fairly wide range for purposes of varying the fat content or the preparation of a diet food with lower calorie content.

As the sucrose, use can be made of various natural or modified sugars, such as cane sugar, beet sugar, dextrose, high fructose sweeteners and the like and the corn sweetener can be supplied as natural or modified sweetener of the type well known in the trade such as corn sweeteners of various dextrose equivalents (d.e.) and mixtures thereof, preferably ranging from 26-43 d.e.

As the stabilizer, use can be made of sherbet stabilizers of the type marketed by Germantown Manufacturing Co. under the trade name PGX-1. Instead, other conventional stabilizers can be used.

Any of a large number of yogurt cultures can be used to inoculate the dairy portion. In the preferred practice, represented by the foregoing example, use is made of a culture of the acidophilus type. The amount of culture and the incubation temperature and time can be varied over fairly wide limits, depending somewhat on the taste and acidity desired in the final product. Final adjustment of acidity to taste can be effected, if desired, by the addition of edible organic acids, such as citric acid, lactic acid and the like in various concentrations, such as a 50% citric acid solution.

In the preferred practice of this invention, fluid acid whey is used as the sole diluent in order to take advantage of the improved taste, body and texture derived from the acid whey, while at the same time increasing the food value of the product. A significant economic advantage is also made available from the use of a readily available raw material which is otherwise faced with the environmental problems and cost of disposal. The amount of fluid acid whey which can be used is limited by the solids content required in the final product. Usually it is undesirable to make use of an amount of fluid acid whey which exceeds 50% by weight of the total mix. Thus, if use is made of dairy ingredients in dry powdered form, such as dry milk solids-non-fat or cream separated to a high fat content such as in plastic cream, it is desirable to make up the difference by addition of water as a diluent to bring the total solids to within a preferred range of about 22-30% by weight. Thus, fluid acid whey can replace water in the formula either in part or as the sole diluent preferably in an amount within the range of 30-45% by weight of the total mix. On a dry weight basis the acid whey solids are employed in an amount within the range of 5-15% by weight of the total solids and preferrably 8-12% by weight of the total solids.

The soft-serve frozen yogurt prepared in accordance with the foregoing example has excellent flavor, body, texture and taste by comparison with the same flavored yogurt mix prepared in the same way, with the same ingredients, except for the substitution of plain water for the fluid acid whey. The normal content of sugar provides typical freezing point depression so that the use can be made of soft-serve freezers for serving the products of this invention. Furthermore, in the unfrozen state, the mixes formulated with acid whey, in accordance with the practice of this invention, remain stable and did not show any wheying off after two months of refrigerated storage. Mixes formulated in this way also can be frozen in dairy containers at −20° F., held at that temperature until needed, thawed for 24 to 48 hours at 35° to 40° F., shaken vigourously to resuspend the mix and frozen in a soft-serve freezer.

It will be apparent from the foregoing, that a method and means has been provided for making beneficial use of a material formed as a by-product from the manufacture of an essential dairy food; which has heretofore been faced with problems for disposal from the standpoint of cost and environmental effect; which not only eliminates the disposal problem but adds significantly to the value of the product produced and to the reduction in cost thereof.

It will be understood that changes may be made in the details of formulation and processing, without departing from the spirit of the invention, especially as defined in the following claims.

I claim:

1. A method for preparing a frozen yogurt containing in admixture cream, condensed skim milk, sucrose, corn sweetener, stabilizers and 30-50% fluid acid whey based on the total weight of the admixture obtained from the manufacture of cottage cheese, said method comprising preparing a first mixture consisting essentially of a major amount of said condensed skim milk and a minor amount of said cream, pasteurizing the mixture, cooling the mixture to incubation temperature, inoculating the cooled mixture with a yogurt culture, incubating the inoculated mixture to acidify the mixture, preparing a second mixture consisting essentially of said sucrose, corn sweetener, stabilizers and 30-50% fluid acid whey, pasteurizing the second mixture, cooling the pasteurized second mixture, mixing the cooled second mixture with the first acidified mixture to produce a third mixture containing a total solid content of 22-35% by weight, homogenizing the third mixture and freezing the third mixture to produce said frozen yogurt.

* * * * *